United States Patent [19]

Reno et al.

[11] 4,432,085
[45] Feb. 14, 1984

[54] DUAL INPUT TELESCOPE FOR MULTI-BEAM OPTICAL RECORD AND PLAYBACK APPARATUS

[75] Inventors: Charles W. Reno, Cherry Hill; Genevieve L. Allee, West Collingswood, both of N.J.

[73] Assignee: RCA Corporation, New York, N.Y.

[21] Appl. No.: 316,659

[22] Filed: Oct. 30, 1981

[51] Int. Cl.³ ............................ G11B 3/74; G11B 7/00
[52] U.S. Cl. .................................... 369/93; 369/111; 369/112
[58] Field of Search ............ 369/93, 111, 112, 44; 350/453

[56] References Cited

U.S. PATENT DOCUMENTS

| | | | |
|---|---|---|---|
| 3,924,063 | 12/1975 | Simons | 369/112 X |
| 4,044,378 | 8/1977 | Laub | 358/128 |
| 4,094,010 | 6/1978 | Pepperl et al. | 365/215 |
| 4,097,895 | 6/1978 | Spong | 358/128 |
| 4,167,024 | 9/1979 | Hamisch | 369/110 X |
| 4,199,217 | 4/1980 | Rogers | 350/453 X |
| 4,222,071 | 9/1980 | Bell et al. | 358/128.5 |
| 4,344,164 | 8/1982 | Bricot et al. | 369/111 X |

*Primary Examiner*—Aristotelis M. Psitos
*Attorney, Agent, or Firm*—Joseph S. Tripoli; Robert L. Troike; Christopher L. Maginniss

[57] ABSTRACT

A wideband optical disc data record/playback apparatus includes apparatus for splitting the output light beam of a single laser into a plurality of read and record light beams. The read and record beams are directed along a read light path including a beam splitter and a record light path including a modulator and a beam splitter respectively. In the apparatus, the read and record light beams are recombined and directed along a common light path to an objective lens where the beams are focused on a surface of a record medium as diffraction limited spots. A dual-input lens beam-expansion telescope is utilized with the beam combiner optics to provide expanded light beams which fill the entrance aperture of the objective lens.

11 Claims, 4 Drawing Figures

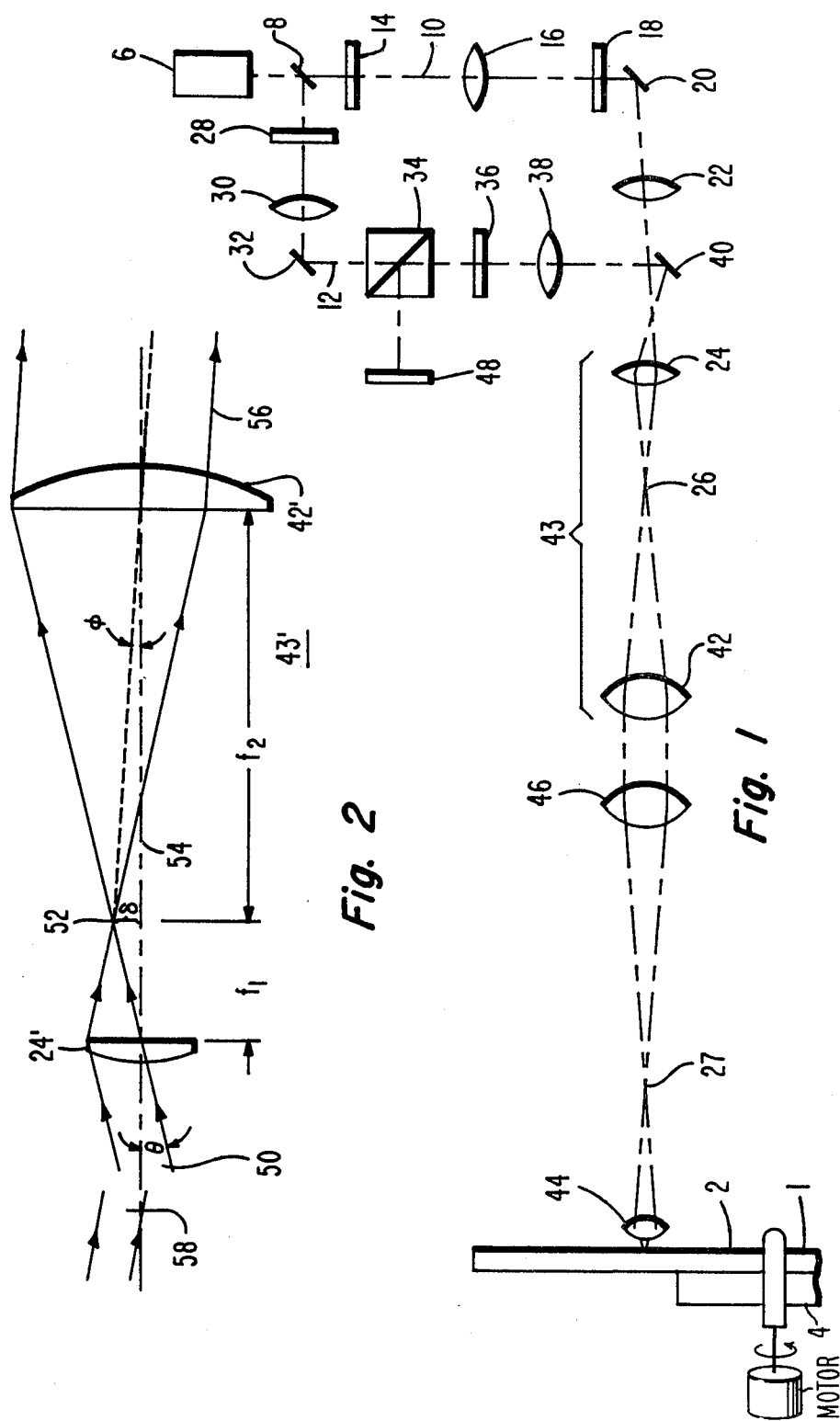

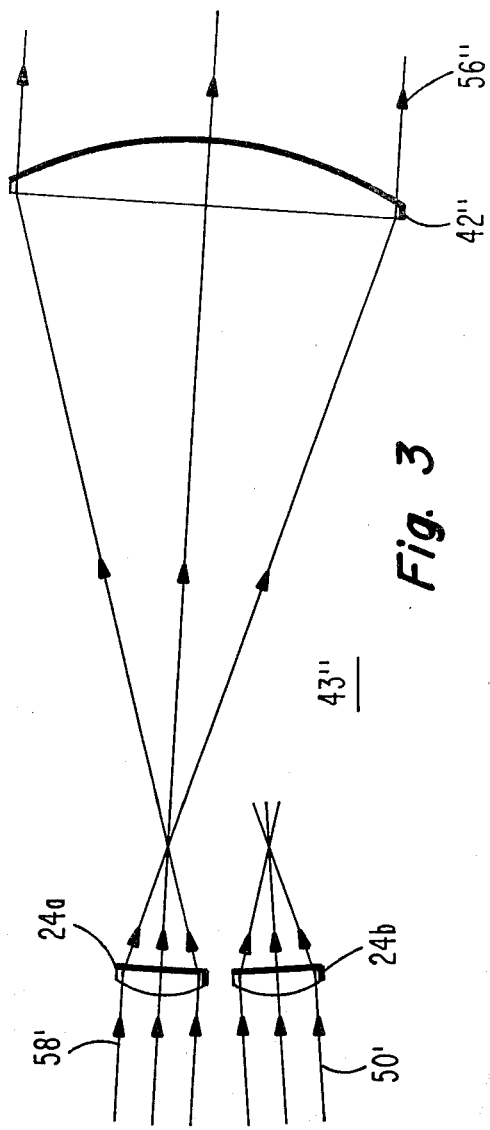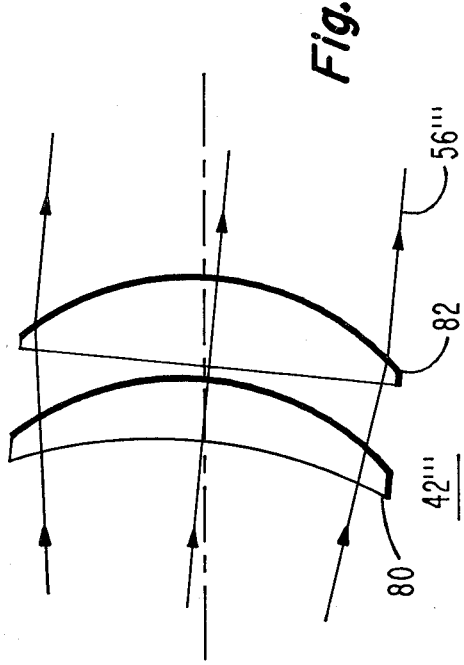

DUAL INPUT TELESCOPE FOR MULTI-BEAM OPTICAL RECORD AND PLAYBACK APPARATUS

The Government has rights in this invention pursuant to a Government contract.

This invention relates generally to apparatus for optically reading and recording high density information, digital or analogue, on the surface of a record medium and, more particularly, to apparatus for optically reading and recording data at extremely high data rates where the use of multiple light beams is desirable.

High density optical recording systems which may be used for recording and playing back information are known in the prior art. For example, U.S. Pat. No. 4,097,895 (Spong) describes an optical disc record/playback system wherein data is recorded in the form of pits in an absorptive coating on the surface of an optical disc. In the Spong system, approximately $1 \times 10^{11}$ bits of information can be stored on one side of a disc-shaped record medium having a 30 cm. diameter.

Data recording and retrieval systems are also known where the rate at which information is recorded or played back may be increased two, three or more times over a Spong type system by recording or playing back multiple tracks of information simultaneously. In U.S. patent application Ser. No. 288,550 filed for C. W. Reno on July 30, 1981, a single light beam from a radiation source is split into two beams, one light beam traverses a read light path and the other a playback light path. In this system, the read and playback beams are each split into a plurality of read and playback beams respectively. For example, if three tracks of data are to be recorded and played back simultaneously the read and playback beams are split into three read and three playback beams. After the beams have been split and the read beams have been modulated with the data to be recorded, the read and playback beams are combined to traverse a common light path to the surface of the disc. The read and playback beams are then focused on the disc surface as diffraction limited spots. The alignment of the beams is such that the playback beams are focused just a few micrometers behind the focused record beams and colinear therewith. In this alignment the playback beams are positioned to immediately playback the recorded information for error correction and data verification.

In the Reno multiple beam optical system, the common light path includes a beam expansion telescope for expanding the cross-sectional area of the respective beams such that each beam fills the aperture of the objective lens used to focus the beams to diffraction limited spots on the surface of the record medium. If the light rays which pass through a beam expansion telescope are slightly off-axis (e.g., one-half of a degree) with respect to the optical axis of the beam expansion telescope lenses, aberrations may affect the performance of the system. In the Reno system the well-collimated read and record beams are passed through a common telescope at slightly divergent angles. The angular field required for a single input lens of the telescope exceeds the diffraction limited capability of the lens. Generally, this is a problem with the input, and not the output, lens of the telescope because the input lens has an angular field which is greater than the angular field of the output lens by the ratio of their focal lengths.

In accordance with the principles of the present invention, the optical elements of the multiple-beam optical record and playback apparatus are selected and arranged such that lens aberrations effected by off-axis light rays are reduced or eliminated.

In accordance with one aspect of the present invention, an optical recording and retrieval system for use in recording and retrieving data on a surface of a record medium is provided. The system includes a light source for providing a beam of collimated light. The beam from the source is split into read and playback light beams which define first and second light paths respectively. The read and playback beams are combined by suitable means to form a third light path which optically couples the combining means and the surface of the record medium. A beam expansion telescope having first and second input lenses is positioned in the third light path. The first and second input lenses are positioned in the third light path such that the longitudinal axes of the read and playback beams are coaxial with the optical axes of the first and second input lenses respectively.

Other features and advantages of the invention will be more fully understood from the following detailed description of the preferred embodiment, the appended claims and the accompanying drawing in which:

FIG. 1 illustrates a multiple beam optical record and playback apparatus;

FIG. 2 illustrates the optical principles of a beam expansion telescope;

FIG. 3 illustrates a beam expansion telescope for use in a system of the type described in FIG. 1 in accordance with the principles of the present invention; and FIG. 4 shows an output lens arrangement for a beam expansion telescope in accordance with the principles of the present invention.

In accordance with the embodiment of FIG. 1, data are recorded in precisely located tracks for rapid retrieval. Recording is achieved on a light sensitive disc 1 into which data are generally permanently recorded. Data recording is generally effected by ablation or melting. The recorded information is available immediately without further processing of any kind. Illustratively, disc 1 is formed having a light sensitive surface 2 upon which ablative recording by the thermal effects of a focused laser beam may be made. For example, a preferred disc for ablative recording may be of a type described in U.S. Pat. No. 4,222,071 issued to A. E. Bell et al.

To provide optical scanning of the surface 2 of disc 1, turntable 4 is rotated by a motor (not shown) and moved linearly by a stage transport (not shown). Illustratively, the scanning of surface 2 of disc 1 by a focused laser beam may be accomplished in accordance with the technique described in the aforementioned Reno application.

In operation, the light output of light source 6 (illustratively, an argon-type laser emitting a monochromatic light beam of a wavelength of 488 nm.) is split by beam splitter 8 into record and play beams (illustratively, 95% of the light from laser 6 passes through splitter 8 in a record beam path 10 and 5% is reflected in a play beam path 12). The record beam passes through record beam splitter 14 where the single beam is efficiently divided into a plurality of separate, equal amplitude, coplanar beams (illustratively, three beams). Illustratively, beam splitter 14 may be a phase grating for splitting the record beam into three equal amplitude beams as disclosed in the aforementioned Reno application. The equal amplitude beams are then passed via lens 16 to multichannel modulator 18 which independently impresses each beam with the information to be recorded. After being modulated, the recording beams are reflected by mirror 20 and pass through lens 22 to follow a light path 26 which includes lens 24.

The play beam which follows light path 12 passes through play beam splitter 28 where the single beam is efficiently divided into a plurality of separate equal amplitude, coplanar beams (illustratively, four beams, the fourth beam may be used for tracking purposes in accordance with the aforementioned Reno application). From there the play beams pass through lens 30 and are reflected by mirror 32 to traverse light path 12. The polarization of the low power play beams is set to allow passage through polarizing beam splitter 34 on a first pass. The play beam passes through quarter-wave plate 36 and lens 38 to mirror 40. Mirror 40 directs the play beams to merge with the record beams. The combination of mirrors 20 and 40 act to combine the play and record beams so that they can be passed through a common optical system (light path 26) to the disc surface.

The beams from the combiner mirrors 20, 40 pass through lenses 24 and 42. The combination of lenses 24 and 42 provide a beam expansion telescope 43. The details of beam expansion telescope 43 will be described herein.

The record and playback beams pass through lens 46 and are focused on surface 2 by objective lens 44 as diffraction limited spots. The record spots are aligned on disc 1 to form closely spaced (illustratively, 1 μm) parallel information tracks during the recording process. These spots have sufficient power to ablate or melt the absorptive coating on surface 2 to form pits whose reflectivity is much higher than the normally non-reflective surface of a Bell type record disc. The play beams are focused as spots and aligned to be colinear with the recorded information tracks at a point where they allow readout of the data just after recording (illustratively, the play spots are positioned to land approximately 40 μm behind the record spots). The fourth play spot is used for tracking purposes. This spot is dithered in accordance with the aforementioned Reno patent application to maintain the light spots of the play and record beams on track.

Light from the playback spots is reflected by the recorded pits on surface 2 and passed through the optical system to the polarizing beam splitter 34. At this point, the light polarization of the playback light beams has been retarded by half a wave (i.e., two passes through quarter-wave plate 36) and the light is deflected by splitter 34 on its second pass therethrough to the multi-element detector array 48. The changes in disc reflectivity introduced during recording are converted into electrical signals representative of the recorded information. In normal playback the electrical signals are delivered to suitable processing electronics (not shown) for signal processing.

An illustrative embodiment of this system will now be given. Lenses 16, 22, 30 and 38 may have focal lengths of 86 mm and be positioned so that approximately one focal length distance is provided between splitters 14 and 28 and lenses 16 and 30 respectively and two focal lengths distance is provided between lenses 16 and 30 and lenses 22 and 38 respectively. Modulator 18 is positioned so that approximately one focal length is provided between lens 16 and it and lens 22 and it, i.e., one focal length distance between each element. The beams formed by the grating 14 are imaged as a series of small spots in modulator 18 by lens 16. Input lens 24 of telescope 43 which, illustratively, has a focal length of 31 mm is positioned at approximately the sum of the focal lengths of lenses 24 and 22 and lenses 24 and 38 from lenses 22 and 38 respectively. Lenses 42 and 46 are illustratively 160 mm focal length lenses and objective lens 44 has an illustrative focal length of 4 mm. Telescope 43 is formed with lenses 24 and 42 separated by the sum of their focal lengths. Lenses 46 and 42 whose separation will vary as various portions of the media are accessed are separated by a nominal amount, illustratively, 25 mm. Objective lens 44 and lens 46 are separated by two times the focal length of lens 46.

In the focal plane of lens 24, i.e., between lenses 24 and 42, a real image of the light spots of modulator 18 is formed. The size of the spots in the focal plane of lens 24 is reduced by the ratio of the focal lengths of lens 22 to lens 24. The combination of lenses 42 and 46 form another real image of the spots of modulator 18 at beam waist 27 where the magnification is 1:1. This image is further reduced in size at the surface 2 by the action of lens 44. This reduction is equal to the magnification of lens 44.

Reference will now be made to FIG. 2 for a explanation of the operation of telescope 43 of FIG. 1. Telescope 43' includes input lens 24' and output lens 42' separated by a distance equal to the sum of their focal lengths. The light rays from a collimated beam 50 are incident on the entrance face of lens 24' at an angle $\theta$ to the optical axis 54 of telescope 43'. Reference to optical elements identified by primed numerals correspond to the optical elements of like numerals which are unprimed in FIG. 1. The parallel rays incident on the entrance face of lens 24' are focused to a point 52 in the focal plane of lens 24' displaced from the optical axis 54 by a distance $\delta$. The light from point 52 which passes through lens 42' is again collimated as beam 56 which has been expanded so that the light that reaches objective lens 44 of FIG. 1 completely fills the entrance aperture thereof.

The bundles of light which pass through telescope 43' have been simplified to reduce the confusion of crossing rays. In the present case, for example, beam 50 represents only one of the three read beams coming from mirror 20 of FIG. 1. Likewise beam 58 which represents one of the four playback beams from mirror 40 is not shown drawn through telescope 43'.

One of the problems with regard to telescope 43' is that the angular field required for lens 24' exceeds its diffraction limited capability. The angle $\theta$ which is formed between the beam longitudinal axis and the optical axis 54 of lens 24' exceeds the diffraction limits of lens 24'. This problem is generally associated with the input lens 24' and not the output lens 42' because the angular field of the input lens is greater than that of the output lens by the ratio of their focal lengths. For example, the tangent $\theta$ which is equal to $\theta$ for small angles is equal to $\delta$ divided by the focal length $f_1$ of lens 24'. The tangent of $\cap$ is equal to $\delta$ divided by the focal length $f_2$ of lens 42'. The aberrations of a lens are proportional to angle of incidence or the square of the angle of incidence, for example, astigmatism is proportional to the square of the angle. Therefore, illustratively, in a system as described in FIG. 1 the astigmatism of lens 24' which has a focal length of 31 mm is on the order of twenty-five times the astigmatism of lens 42' which has a focal length of 160 mm.

Another problem with the telescope of FIG. 2 is that the bundles of light are incident on lens 24' near the edge (illustratively, the bundle of light is shown centered in the lens aperture rather than positioned near the edge of the lens) of the lens where lens aberrations are more deleterious.

Referring to FIG. 3 a telescope 43" is shown which reduces the aberrations of a system as shown in FIG. 2. Again, the ray drawing has been simplified to provide sufficient detail to understand the system and yet eliminate ray crossings which tend to confuse the figure. In this system the single input lens 24' of FIG. 2 has been replaced by two input lenses 24a and 24b. Lens 24a is positioned on axis with respect to beam 58' from mirror 40 of FIG. 1 and lens 24b is positioned on axis with respect to beam 50' from mirror 20 of FIG. 1. The light from both lenses 24a and 24b is then passed via lens 42". Using two input lenses to telescope 43' allows the incident beams to be arranged such that the axes of the beams and the optical axes of the input lenses generally coincide (there is a complication in that the light of the three spots from modulator 18 is converging so that not all three beams are on axis—these angles are small, i.e., one tenth of the separation of read and write spots). This on-axis arrangement substantially reduces or eliminates the aberrations effected by the input lenses of the telescope. Further, the lenses may now be arranged so that the light incident thereon strikes the lens nearer the center, i.e., away from the edge of the lens.

In those cases where the dual-input lenses to the telescope do not provide sufficient improvement with respect to the aberrations of the telescope, another improvement may be made in the system. Accordingly, the single-element output lens 42" may be replaced with a doublet 42''' as shown in FIG. 4. Illustratively, a separated doublet comprising a first lens 80 of 320 mm focal length separated by a distance of 2 mm from a second lens 82 of 320 mm focal length may be used.

What is claimed is:

1. An optical information recording and retrieval system for use in recording and retrieving data on a surface of a record medium, said system comprising:
    a light source for providing a beam of light;
    means for splitting said light beam into record and playback light beams defining first and second light paths respectively;
    means for combining said record and playback light beams such that said record and playback light beams form a third light path optically coupling said combining means and said surface of said record medium;
    a beam expansion telescope positioned in said third light path, said beam expansion telescope having first and second input lenses, said first and second input lenses being positioned in said third light beam path such that the longitudinal axes of said record and playback light beams are substantially coaxial with the optical axes of said first and second input lenses respectively and the optical axes of said input lenses are not coaxial.

2. The system according to claim 1 wherein said beam expansion telescope further includes a multi-element output lens for reducing aberrations effected by said readout and playback light beams being off-axis with respect to the optical axis of said output lens.

3. The system according to claim 2 wherein said multi-element output lens comprises a doublet.

4. The system according to claim 3 wherein said multi-element output lens comprises a separated doublet.

5. The system according to claim 1 or 2 wherein said record medium is formed in the shape of a disc and has an optically sensitive surface which is ablated by said record light beam during recording.

6. The system according to claim 5 further comprising means for establishing relative motion between said disc-shaped record medium and said record and playback light beams.

7. A multiple beam optical recording and retrieval system for use in recording and retrieving data from a surface of a record medium, said system comprising:
    a light source for providing a beam of light;
    first means for splitting said beam of light into record and playback light beams defining first and second light paths respectively;
    second means, positioned in said first light path, for splitting said record beam into a plurality of record beams;
    means for modulating each of said plurality of record beams;
    third means, positioned in said second light path, for splitting said playback beam into a plurality of playback beams;
    means for combining said plurality of record beams and plurality of playback beams such that said combined record and playback beams form a third light path optically coupling said combining means and said surface of said record medium;
    a beam expansion telescope, positioned in said third light path, said beam expansion telescope having first and second input lenses, said first and second input lenses being positioned in said third light beam path such that the longitudinal axes of said record and playback light beams are substantially coaxial with the optical axes of said first and second input lenses respectively and the optical axes of said input lenses are not coaxial.

8. The system according to claim 7 further comprising:
    means for focusing said combined record and playback light beams to a plurality of respective diffraction limited spots on said surface of said record medium.

9. The system according to claim 8 wherein said beam expansion telescope includes a multi-element output lens for reducing aberrations effected by said record and playback light beams being off-axis with respect to the optical axis of said output lens.

10. The system according to claim 9 wherein said multi-element output lens comprises a doublet.

11. The system according to claim 10 wherein said multi-element output lens comprises a separated doublet.

* * * * *